United States Patent
Bhattiprolu et al.

(10) Patent No.: US 9,111,261 B2
(45) Date of Patent: Aug. 18, 2015

(54) METHOD AND SYSTEM FOR MANAGEMENT OF ELECTRONIC MAIL COMMUNICATION

(75) Inventors: Sukadev Bhattiprolu, Beaverton, OR (US); Venkateswararao Jujjuri, Beaverton, OR (US); Malahal R. Naineni, Beaverton, OR (US); Badari Pulavarty, Beaverton, OR (US); Chandra Seetharaman, Beaverton, OR (US); Narasimha Nageshrao Sharoff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 12/766,686

(22) Filed: Apr. 23, 2010

(65) Prior Publication Data

US 2011/0264991 A1    Oct. 27, 2011

(51) Int. Cl.
| | |
|---|---|
| G06F 17/00 | (2006.01) |
| G06Q 10/10 | (2012.01) |
| H04L 12/58 | (2006.01) |
| G06F 15/167 | (2006.01) |
| H04L 29/06 | (2006.01) |
| H04L 12/24 | (2006.01) |

(52) U.S. Cl.
CPC .......... *G06Q 10/107* (2013.01); *G06F 15/167* (2013.01); *G06Q 10/10* (2013.01); *H04L 12/58* (2013.01); *H04L 41/026* (2013.01); *H04L 65/4023* (2013.01)

(58) Field of Classification Search
CPC ............ G06F 2211/006; G06F 15/167; G06Q 10/107; G06Q 10/10; H04L 41/026; H04L 65/4023; H04L 12/58

USPC .......... 715/203, 205–208, 229, 752; 709/206, 709/207; 707/102
See application file for complete search history.

(56) References Cited

U.S. PATENT DOCUMENTS

| | | | |
|---|---|---|---|
| 6,615,276 B1* | 9/2003 | Mastrianni et al. ........... | 709/250 |
| 6,704,772 B1 | 3/2004 | Ahmed et al. | |
| 7,617,297 B2 | 11/2009 | Bruce et al. | |
| 7,831,676 B1* | 11/2010 | Nagar ........................... | 709/206 |
| 2002/0077846 A1* | 6/2002 | Bierbrauer et al. ............... | 705/1 |
| 2002/0122543 A1 | 9/2002 | Rowen | |
| 2005/0283461 A1 | 12/2005 | Sell et al. | |
| 2006/0020668 A1 | 1/2006 | Chen et al. | |
| 2006/0129602 A1 | 6/2006 | Witriol et al. | |
| 2006/0248155 A1 | 11/2006 | Bondarenko et al. | |
| 2007/0168435 A1* | 7/2007 | Moraca et al. ................ | 709/206 |
| 2007/0180033 A1 | 8/2007 | Singh et al. | |
| 2008/0052324 A1 | 2/2008 | Choubey et al. | |
| 2008/0244027 A1* | 10/2008 | Foulger et al. ................ | 709/206 |
| 2009/0030997 A1 | 1/2009 | Malik | |
| 2009/0282086 A1 | 11/2009 | Heimes | |

* cited by examiner

*Primary Examiner* — Quoc A Tran

(74) *Attorney, Agent, or Firm* — Lieberman & Brandsdorfer, LLC

(57) ABSTRACT

A method, system, and article for management of email communication content across a computer system network. An archive of email communications is retained on storage media in communication with the network. In addition, email communication is retained on storage media in communication with a client machine in the network. To mitigate duplication of email communications, duplicate communications are replaced with a hyperlink to the archive communication. This replacement supports removal of the duplicate communication from the storage media in communication with the client machine.

21 Claims, 3 Drawing Sheets

METHOD AND SYSTEM FOR MANAGEMENT OF ELECTRONIC MAIL COMMUNICATION

BACKGROUND

1. Technical Field

This invention relates to management of electronic mail communications in a computer operating environment. More specifically, the invention relates to a method and system for reducing storage space requirements for electronic mail communications.

2. Description of the Prior Art

Electronic mail, hereinafter referred to as email, is a transmission of a message over a communication network. In recent years, the use of email has grown as a form of both personal and business communication. Once an email is created and sent to a recipient, it is stored on some form of data storage media, either at the recipient location, the server location, or both. As the use of email communications increases, so does the storage space requirements to retain a copy of each email communication. In some environments, email sent by users is posted on a web site that is available for the public. An example of one such environment is the open source community. More specifically, open source development pertains to development of source code that is available to the general public for use and/or modification from its original design free of charge. Open source code is typically created as a collaborative effort in which programmers improve upon the code and share the changes within the community. Accordingly, in the open source community, as well as other public communities, there is the proliferation of email communication.

With the growth of the computing community around the world, the use of email communications is increasing with no foreseeable abatement. This increase of email communications places a burden on storage media employed to retain all of these communications. Accordingly, there is a need to reduce the burden of email communications on storage media.

SUMMARY

A method, system, and article for management of email communications in a computer networking environment are provided.

In one aspect, a method is provided for managing electronic mail communications. An archive of received email content is maintained in storage media in communication with a server managing a web site. The archive is maintained on a web site and the location of the archive is known to a recipient of the email communication. In addition, a copy of transmitted email content is retained in storage media local to a client machine. A location of the received email content in the archive is identified, followed by a comparison of the transmitted email with the archive of the received email. The comparison includes verifying that the archive is a duplicate of the transmitted content. In response to completion of the verification, the verified content of the transmitted email is replaced with a hyperlink directed to the identified location of the content in the archive.

In another aspect, a computer system is provided with a client machine in communication with a server across a network. Storage media is provided in communication with the client machine and a copy of sent and received electronic mail (email) communications are maintained in the storage media. A server is provided in to the system to host a web site, and to maintain an archive of email content in storage media in communication with the server. The archive is maintained on a web site, with the location of the archive known to a recipient of the email communication. To manage email communications, a location manager is provided in the system to search for and identify a location of content from an email communication in the archive, and a verification manager is provided in communication with the location manager, to compare content of the email communication local to the client machine with a copy of the email content retained in the archive. In addition, a replacement manager is provided in communication with the verification manager, the replacement manager replaces the compared content of the email with a hyperlink directed to the identified location of the content in the archive.

In yet another aspect, an article is provided with a client machine in communication with a server across a network. Storage media is provided in communication with the client machine to maintain a copy of transmitted electronic mail (email) communication content, and a web site is in communication with the server. The web site maintains an archive of received email communication content in storage media in communication with the server. The archive is maintained on a web site, and wherein the location of the archive is known to a recipient of the email communication. A computer-readable storage medium is provided with computer program instructions configured to manage email communication. Instructions are provided to search for and identify a location of email message content retained in the archive. In response to the location identification, instructions are provided to compare content of the transmitted email with the archive of the received email content, including instructions to verify that the archive is a duplicate of the transmitted content. Instructions are also provided to replace the verified content of the transmitted email with a hyperlink directed to the identified location of the content in the archive.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

Figure 1:
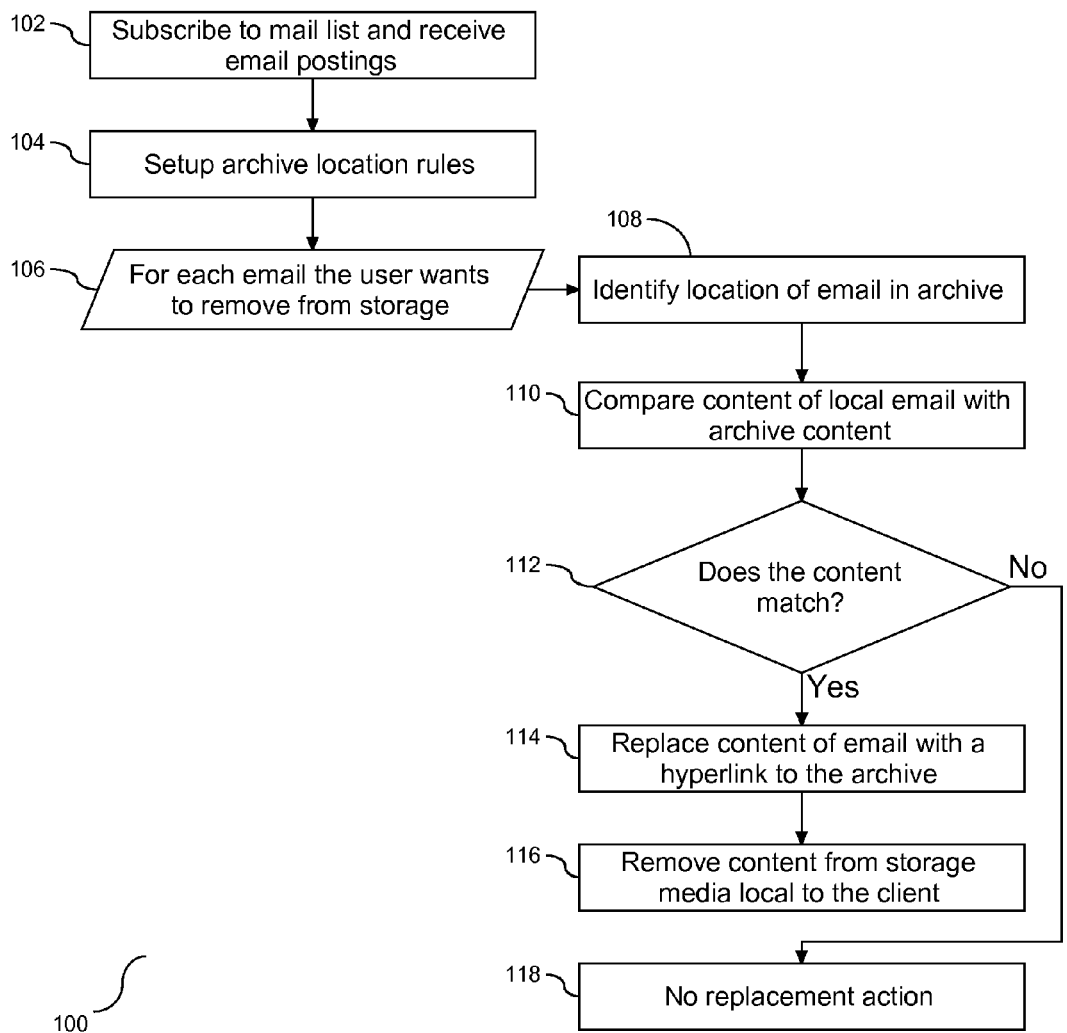
FIG. 1 is a flow diagram illustrating the manner in which email communications are archived, and how the archive is employed to save storage space requirements.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments.

The functional units described in this specification have been labeled as tools, modules, and/or managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A method and system are provided to reduce storage space requirements for email messages based upon finding a duplicate copy of an email message in an archive. More specifically, an archive of email content is maintained on a web site with the web site maintained on a website, with the location of the archive known to a recipient of the email communication. In one embodiment, the web site is a public web site, a semi-public web site, or a subscription-only web site. By determining that the email content and the replication on the archive are in fact duplicates, the content of the email message is replaced by a link to the archive. This act of replacement removes the content from both the body of the email message and from local storage media. In effect, the storage size of the message is reduced, as a link to an external location is generally considered to require less storage space than the storage space required for the content of the message.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Electronic mail is the transmission of a text message from a sender to a recipient. The sender can send the message to a single recipient or multiple recipients. The manner in which electronic mail messages are retained for historical purposes is known as email archiving. More specifically, email archiving is a systematic approach to saving and protecting the data contained in email messages so it can be accessed at a later date. In one embodiment, email archiving may include indexing and search capabilities to enable efficient location of email messages.

FIG. 1 is a flow diagram (100) illustrating the manner in which email communications are archived, and how the archive is employed to save storage space requirements. A user subscribes to a mailing list to receive email postings (102). Mailing lists are employed in different forums and are used to maintain communication and to resolve outstanding issues. For example, in the open source community, mailing lists may be employed to post solutions to errors that are uncovered in source code. Once the user is subscribed to the mailing list, the user sets up one or more rules to indicate the location of the archive of the web site mailing list (104). In one embodiment, the user may be subscribed to more than one mailing list, and as such, the user may need to ascertain the proper web site archive location for each separate mailing list. Conversely, in another embodiment, multiple web sites may be employed to archive a single mailing list, in which case the user must ascertain each web site designated to archive the subject mailing list. The email transactions for all subscribers to the web site are archived on storage media remote from the client machine, and at the same time all email communications associated with the web site that are either sent by the client machine or received by the client machine are stored on storage media local to the user. Accordingly, there is a duplicate storage of email transactions associated with web sites, or any other location, that maintains an archive of email communication.

For each email communication that the user wants to remove from storage (106), the user or a tool identifies the location of the email message in the proper archive (108). Following the identification, the content of the email communication local to the client machine is compared with the content of the email communication in the archive (110). It is known in the art that each email communication contains an identifier as part of or separate from a header, and that this identifier can be used to search one or more archives to identify a prospective duplicate communication. However, the comparison of the email communication at step (110) is expanded beyond the mere identifier, and is directed to the content of the email message. Following step (110), it is determined if the content of the email communication matches the content identified in the archive (112). A positive response to the determination at step (112) is followed by replacing content of the email communication local to the client machine with a hyperlink to the location of the matching content on the archive (114). As it is known that email communication content on a client machine is stored in media local to the client, the process of replacing the local email content includes removing the content from the storage media local to the client (116). Conversely, a negative response to the determination at step (112) does not allow the replacement action to take place (118). Accordingly, as demonstrated herein individual email communications may be replaced with a hyperlink to an identified location of the email content in an archive location.

The process demonstrated in FIG. 1 addresses individual email communications. In one embodiment, the replacement scheme demonstrated in FIG. 1 may be expanded to incorporate multiple email communications. More specifically, a set of email communications can be selected for replacement. The multiple communication process follows a similar set of steps to that demonstrated in FIG. 1, wherein the content of the email communications must match with the content in the archive. Matching content of multiple email communications is replaced with one or more hyperlinks to the appropriate locations in the archive. Once the hyperlink(s) has been properly embedded into the email communication(s), the content that the hyperlink is replacing is removed from the subject email communications and the local storage media. The archive content remains in its storage media location. Accordingly, a comparison that employs multiple email communications uses one or more hyperlinks to replace the content of the communications, followed by removal of the communication content from local storage.

Figure 2:
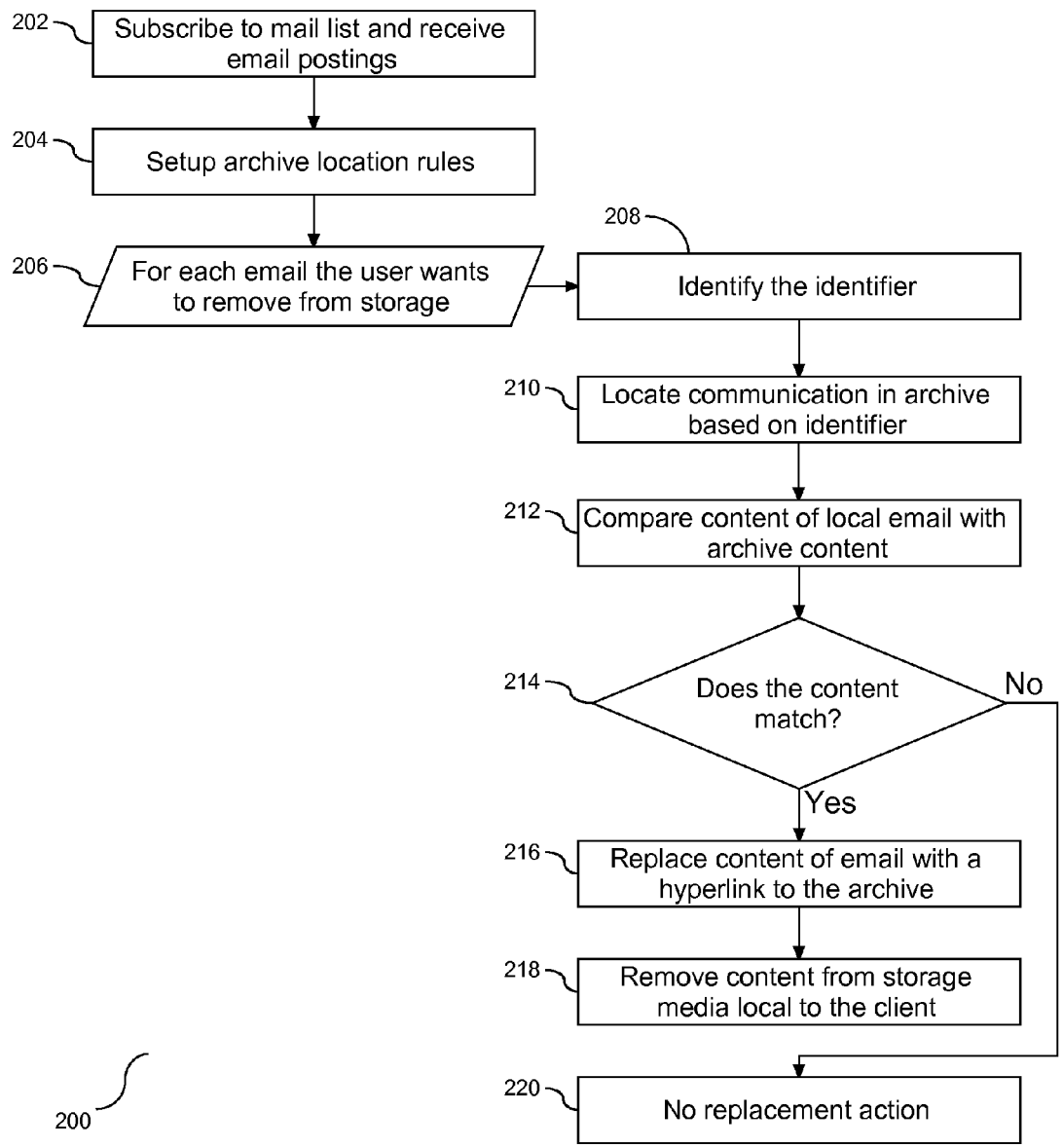
FIG. 2 is a flow diagram illustrating a process for leveraging a time stamp in relation to replacement of content with a hyperlink.

In addition, the process demonstrated in FIG. 1 can be modified to address time stamps associated with email communications and archiving. FIG. 2 is a flow chart (200) illustrating a process for leveraging an identifier in relation to replacement of content with a hyperlink. As in FIG. 1, a user subscribes to a mailing list to receive email postings (202). Once the user is subscribed to the mailing list, the user sets up one or more rules to indicate the web site where the mailing list is archived (204). For each email message that the user wants to collapse (206), the user identifies the identifier of the email communication (208) and locates the subject communication in the archive based on the identifier (210). In one embodiment, the identifier parameter of a single email communication may include a time stamp or a time period, including a start time and an end time. Once the communication in the archive is located, the content of the email local to the client machine is compared with the content of the email in the archive (212). Although the search in the archive was based on the time stamp, the actual comparison of the communication to the archive is based on content. Following step (212), it is then determined if the content of the email communication matches the content identified in the archive (214). A positive response to the determination at step (214) is followed by replacing content of the email local to the client machine with a hyperlink to the location of the matching content on the archive (216). As it is known that email content on a client machine is stored in media local to the client, the process of replacing the local email content includes removing the content from local storage media (218). Conversely, a negative response to the determination at step (214) does not allow the replacement action to take place (220). Accordingly, as demonstrated herein individual email messages may be identified in the archive based on the time stamp, but replacement of the content with a hyperlink to an identified location of the email content in an archive location is limited to a positive comparison of the email content with the archive.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Figure 3:
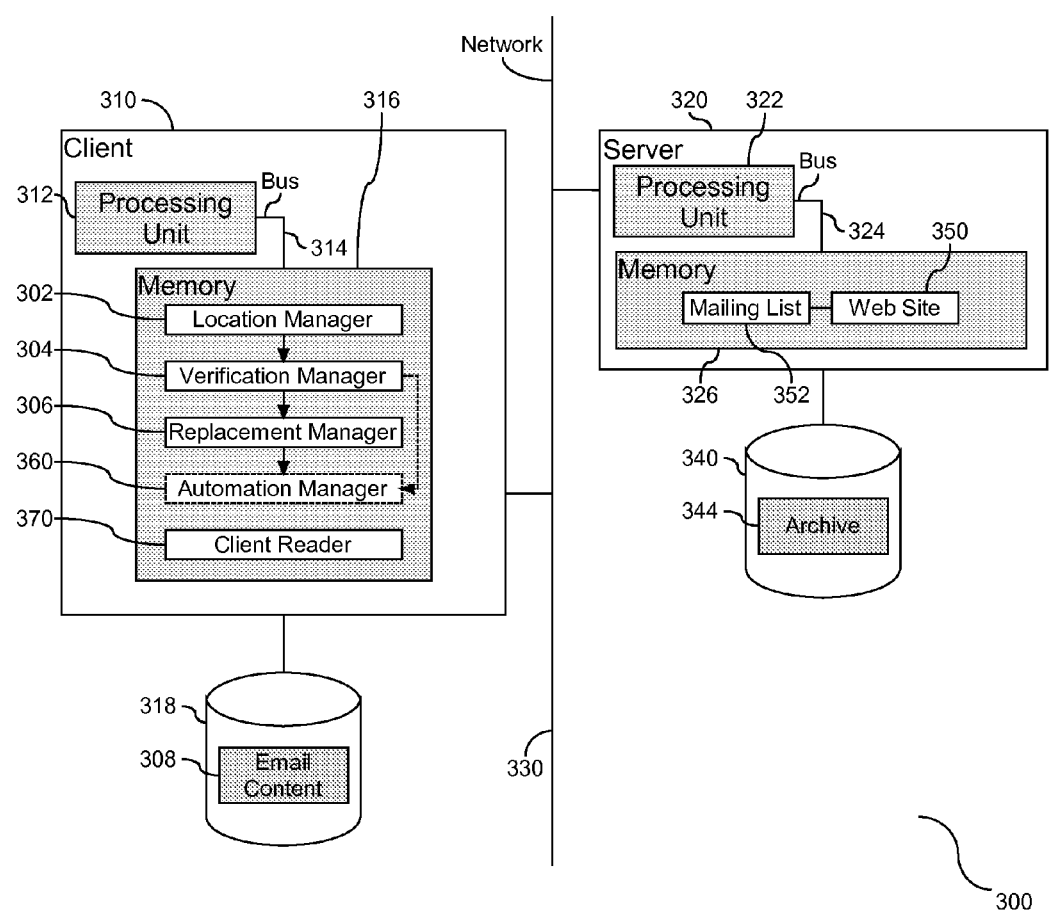
FIG. 3 is a block diagram illustrating a computer system with a client machine and a server, and demonstrating the tools and their associated functionality for management of email communications.

The process of managing email communications and archives of such communications maintained on a web site, may be replaced with one or more tools to facilitate the comparison and to manage local storage media. FIG. 3 is an illustration of a computer system (300) demonstrating the tools and their associated functionality for management of email communications. As shown, a client machine (310) is in communication with a server (320) across a network (330). The client machine (310) is provided with a processing unit (312) in communication with memory (316) across a bus (314). In addition, the client machine (310) is shown herein with local data storage media (318). However, in one embodiment, the storage media may not be local to the client machine (310). For example, in one embodiment, the storage media for the client machine may be located across the network (330). Although one client machine (310) is shown and described in detail, it is understood that the system (300) may be configured with multiple client machines (310) in communication with the server (320) across the network (330). Similar to the client machine (310), the server (320) is provided with a processing unit (322) in communication with memory (326) across a bus (324). The server (320) is shown in communication with storage media (340), which may be either local to the server (320) or remote from the server (320) and in communication therewith across the network (330). The server (320) is employed to host and/or manage one or more web sites (350) with associated data retained on the storage media (340). As explained above with respect to the description in FIG. 1, the web site may be a web site with one or more mailing lists (352) that are subscribed to by one or more client machines.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be an apparatus that can contain or store the program for use by or in connection with the instruction execution system, apparatus, or device.

As shown herein, tools are provided local to the client machine (310) to facilitate organization and management of email communication. More specifically, a tool in the form of a location manager (302) is provided to search and identify a location of email content retained by the server (320). As explained above, the content is retained on storage media (340) in communication with the server (320). The location manager (302) is employed to ascertain the storage location of the email communication that is retained in the archive. Once the storage location is identified, the location manager (302) supplies the storage location to a verification manager (304), which is employed to compare the content (308) of the subject email communication local to the client machine with the archived version of the subject communication. In other words, the verification manager (304) functions as a comparison tool to ensure that there is a match between the email communications local to the client machine with the archived version local to the server (320). There are two outcomes that are available based upon the results of the comparison performed by the verification manager (304), either the comparison is authenticated or rejected. If the content (308) of the email communication and the archive (344) do not match, there is no replacement of the email communication content (308). However, if the verification manager (304) authenticates the comparison, this authentication is communicated to a replacement manager (306) to replace the content (308) of the email communication with a hyperlink to the content maintained on the server archive (344). The act of replacement includes removal of the content (308) from storage media local to the client machine (310). The hyperlink is a communication link that is directed to the location of the content in the archive. In one embodiment, the replacement manager (306) may be configured to send the hyperlink to all recipients of the electronic mail content in response to placement of content in the archive (344). Similarly, in one embodiment, an automation manager (360) may be provided in communication with one or both of the verification manager (304) and the replacement manager (306). The automation manager (360) is configured to automate replacement of content verified by the verification manager (304) with a hyperlink to the location of the verified content in communication with the server (320). In one embodiment, a client reader (370) is provided local to the client machine to automatically expand the hyperlink. The functionality of the client reader (370) may be expanded to include a fetch of content from the archive (344) when the received email is opened. Accordingly, as shown herein, the functionality of the email communication management may be embedded within a set of tools local to the client machine (310).

As shown herein, the location manager (302), the verification manager (304), the replacement manager (306), the automation manager (360), and the client reader (370) each reside in memory (316) local to the client machine (300). In one embodiment, the location manager (302), the replacement manager (306), the automation manager (360), and the client reader (370) may each reside as hardware tools local to the client machine (310) and external to memory (316), or they may be implemented as a combination of hardware and software. Similarly, in one embodiment, the location manager (302), the verification manager (304), the replacement manager (306), and the automation manager (320) may be combined into a single functional item that incorporate the functionality of the separate items. Furthermore, as shown herein, each of the managers (302), (304), (306), (360), and (370) are local to one client machine (310). However, in one embodiment, they may be collectively or individually distributed across a network and function as a unit to embody the functionality of individual units. Accordingly, the managers (302), (304), and (306), and tool (370) may be implemented as software tools, hardware tools, or a combination of software and hardware tools for managing email communications and associated archives.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

The software implementation can take the form of a computer program product accessible from a computer-useable or computer-readable medium providing program code for use by or in connection with a computer or any instruction execution system.

The tools provide for management of email communications, and more specifically for eliminating duplication of email content on storage media. One or more managers or tools are implemented to ensure that a duplicate email communication in storage media in communication with a client machine may be replaced with a hyperlink to the same content on an archive retained on different storage media. Once the hyperlink has replaced the content of the email message, this content may be removed from the storage media in communication with the client machine. The same content on the archive remains within the archive. In one embodiment, the manager(s) and/or tool(s) function in a dynamic manner that automates the replacement of email communication content with archive content, and mitigates any requirements for external contribution.

It will be appreciated that, although specific embodiments of the invention have been described herein for purposes of illustration, various modifications may be made without departing from the spirit and scope of the invention. In particular, in one embodiment a hyperlink may be sent to all email communication recipients as a response to placement of content in the archive. Accordingly, the scope of protection of this invention is limited only by the following claims and their equivalents.

We claim:

1. A method for managing electronic mail (email), comprising:
maintaining a first copy of received email content as an archive in remote storage media in communication with a web site, wherein the archive is maintained on the web site known to an email recipient, said storage media remote from a client machine;

maintaining a second copy of the received email content in storage media local to the client machine;

searching for and identifying a location of the received email content in the archive;

comparing the second copy of the received email with the archive of the first copy of the received email, including verifying that the archive of the first copy is a duplicate of the transmitted content of the second copy;

replacing the duplicated content of the second copy of the received email in the storage media local to the client machine with a hyperlink directed to the identified location of the content of the first copy in the archive, wherein replacing includes removing the duplicated content from both the body of the received email and the storage media local to the client machine; and sending the hyperlink to each e-mail communication recipient as a response to replacement of the content in the archive.

2. The method of claim 1, wherein the step of replacing the duplicated content with a hyperlink removes the content from storage media local to the client machine.

3. The method of claim 2, wherein the archive storage media is in a separate location from the storage media local to the client machine.

4. The method of claim 1, further comprising establishing a set of rules indicating archived mailing lists and the site locations of the archived mailing lists.

5. The method of claim 4, further comprising archiving a single mailing list from multiple site locations.

6. The method of claim 1, wherein searching and identifying a location of the received email content in the archive includes using a time stamp as a search parameter.

7. The method of claim 1, further comprising a client reader, local to the client machine, automatically expanding the hyperlink, including fetching content from the archive when the received email is opened.

8. The method of claim 1, wherein the site location of the archived content spans multiple web sites.

9. A computer system comprising:
a storage device to maintain a second copy of sent and received electronic mail (email);
a server to host a web site, and to maintain an archive of a first copy of email content in remote storage media in communication with the server, wherein the archive of the first copy is maintained on the web site and a location of the archive of the first copy is known to an email recipient;
a location manager to search for and identify a location of the first copy of an email communication in the archive;
a verification manager in communication with the location manager, the verification manager to compare content of the second copy of the email with a first copy of the email content retained in the archive;
a replacement manager in communication with the verification manager, the replacement manager to replace duplicated content of the second copy of the email in the storage device with a hyperlink directed to the identified location of the first copy of the content in the archive, wherein the replacement manager removes the duplicated content from both the body of the received email and the storage media local to the client machine; and said replacement manager to send the hyperlink to each e-mail communication recipient as a response to replacement of the content in the archive.

10. The system of claim 9, further comprising the replacement manager to replace the duplicated content with a hyperlink and to remove duplicated content from the storage device.

11. The system of claim 10, wherein the archive is in a separate storage location from the storage device.

12. The system of claim 9, further comprising a set of rules to indicate an archive mailing list and the site location of the archive mailing list.

13. The system of claim 12, further comprising an archive of a single mailing list maintained from multiple site locations.

14. The system of claim 9, further comprising a reader to automatically expand the hyperlink, including a fetch of content from the archive when the received email is opened.

15. An article comprising:
a storage device to maintain a second copy of transmitted electronic mail (email) content;
a web site in communication with a server, the web site to maintain an archive of a first copy of received email content in remote storage media in communication with the server, wherein the archive of the first copy is maintained on a web site and a location of the archive is known to a recipient, said server remote from the recipient;
a non-transitory computer-readable storage medium including computer program instructions configured to manage email communication, the instructions including:
instructions to search for and identify a location of the first copy of email message content retained in the archive;
instructions responsive to the location identification to compare the second copy of content of the transmitted email with the archive of the first copy of the received email content, including instructions to verify that the archive of the first copy is a duplicate of the second copy of the transmitted content;
instructions to replace the duplicated content of the second copy of the transmitted email in the storage device with a hyperlink directed to the identified location of the first copy of the content in the archive, wherein the replacement removes the duplicated content from both the body of the received email and the storage media local to the client machine; and
instructions to send the hyperlink to each e-mail communication recipient as a response to replacement of the content in the archive.

16. The article of claim 15, wherein replacement of the content with the hyperlink removes the content from the storage device.

17. The article of claim 16, wherein the archive storage media is in a separate location from the storage device.

18. The article of claim 15, further comprising a set of instructions to indicate an archive mailing list and the site location of the archive mailing list.

19. The article of claim 18, further comprising instructions to maintain an archive of a single mailing list from multiple site locations.

20. The article of claim 15, further comprising instructions to automatically expand the hyperlink, including fetching content from the archive, when the received email is opened.

21. The article of claim 15, wherein the web site is selected from the group consisting of: public, semi-public, and subscription-only.

* * * * *